Feb. 13, 1962  C. TRURAN  3,020,637
FLOWER BED AND SOD EDGER
Filed Sept. 3, 1959
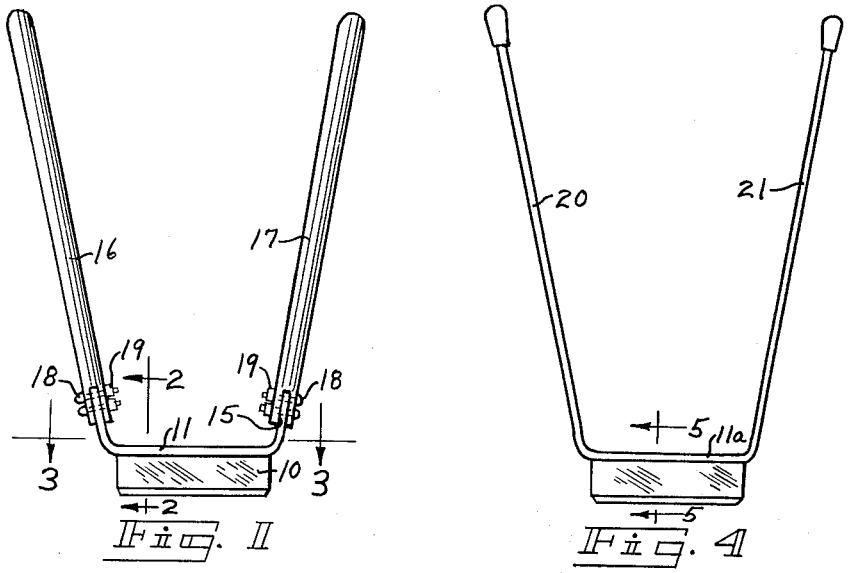
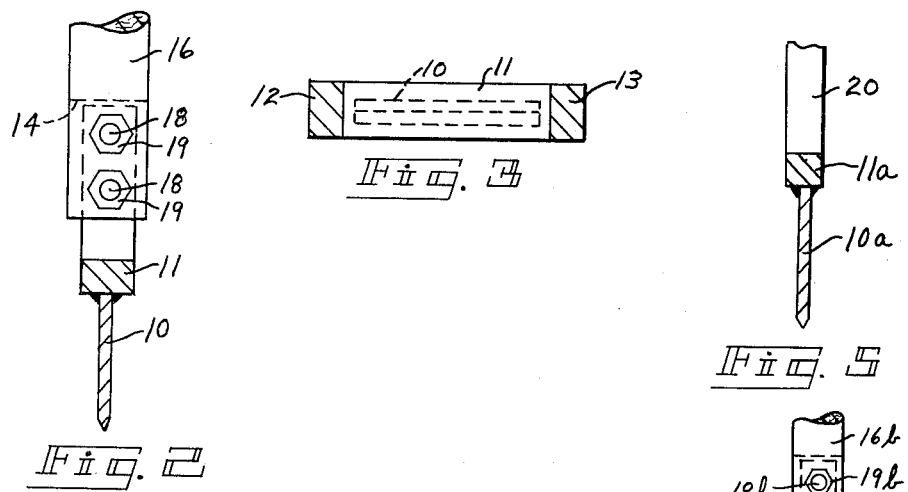
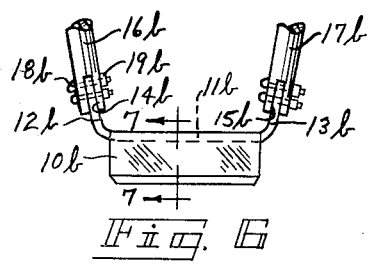
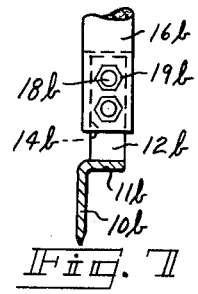
INVENTOR.
CHARLES TRURAN
BY
Donnelly, Mentag & Harrington
ATTORNEYS

3,020,637
FLOWER BED AND SOD EDGER
Charles Truran, 15064 Cheyenne, Detroit, Mich.
Filed Sept. 3, 1959, Ser. No. 837,930
1 Claim. (Cl. 30—315)

This invention relates generally to improvements in garden tools, and more particularly to a novel and improved flower bed and sod edging tool.

It is an object of the present invention to provide a sod edger for trimming the sod adjacent flower beds, sidewalks, driveways and the like which is economical of manufacture, simple and compact in construction and efficient in operation.

It is another object of the present invention to provide a sod edger which is operable by placing the foot of the operator upon the tool and pushing it downwardly into the ground while simultaneously guiding the movements of the tool with a pair of outwardly and upwardly extended handles.

It is a further object of the present invention to provide a sod edger which is characterized by a horizontal member which functions as a foot rest for contact by the foot of the operator for forcing the edger into the sod and which further includes an elongated blade fixed to the lower side of the horizontal member and a pair of upwardly and outwardly extended handles connected to the outer ends of the horizontal member.

Other objects, features and advantages of this invention will be apparent from the following detailed description and appended claims, reference being had to the accompanying drawing forming a part of the specification wherein like reference numerals designate corresponding parts of the several views.

In the drawings:

FIG. 1 is a front elevational view of an illustrative embodiment made in accordance with the principles of the invention;

FIG. 2 is an enlarged, fragmentary, elevational sectional view of the structure illustrated in FIG. 1, taken along the line 2—2 thereof and looking in the direction of the arrows;

FIG. 3 is an enlarged, horizontal sectional view of the structure illustrated in FIG. 1, taken along the line 3—3 thereof and looking in the direction of the arrows;

FIG. 4 is an elevational view of a second illustrative embodiment of the invention;

FIG. 5 is an enlarged, fragmentary, elevational view of the structure illustrated in FIG. 4, taken along the line 5—5 thereof and looking in the direction of the arrows;

FIG. 6 is a fragmentary, elevational view of a third illustrative embodiment of the invention; and, FIG. 7 is an elevational sectional view of the structure illustrated in FIG. 6, taken along the line 7—7 thereof and looking in the direction of the arrows.

Referring to FIGS. 1, 2 and 3 of the drawings, a first illustrative embodiment of the invention is shown therein which comprises a vertically disposed elongated blade 10 which is fixedly connected as by welding to the lower side of the horizontally disposed elongated member or foot rest 11. The blade 10 is sharpened on the lower end thereof and is made from any suitable metallic material. The member 11 may be made from suitable metal bar stock. The foot rest 11 is provided with the upwardly and outwardly extended arms 12 and 13 which are adapted to be received in the slots 14 and 15 in the lower ends of the handles 16 and 17, respectively. The arms 12 and 13 are fixedly secured to the handles by any suitable means as by the bolts and nuts 18 and 19. The handles 16 and 17 may be made from any suitable material as wood, plastic or the like. As shown in FIGS. 1 and 2, the handles 16 and 17 are fixedly disposed in the same vertical plane as the blade 10 but they slope outwardly.

In use, the operator grasps the handles 16 and 17 and places the cutter 11 along a line on the sod where it is desired to perform a trimming operation. The operator then places his foot on the foot rest 11 and presses downwardly thereon whereby the blade 10 is easily and quickly forced down into the sod. The part of the sods so cut may then be easily and quickly moved out of place by pivoting the cutter 10 about one of the handles. The edging or trimming operation is completed by means of making successive cuts as aforedescribed along a desired trimming line. The tool of the present invention may be used for trimming flower beds, lawns and the like, and experience has shown it to be efficient in operation.

FIGS. 4 and 5 illustrate a second embodiment of the invention in which the handles are made integral with the foot rest. As shown in FIGS. 4 and 5, this embodiment includes a cutting blade 10a and a horizontal foot rest 11a to which it is connected by any suitable means, as by welding. The foot rest 11a is integrally connected to the handles 20 and 21. The handles 20 and 21 extend upwardly and outwardly in the same fashion as the handles 16 and 17 of the embodiment of FIG. 1. The handles 20 and 21 are formed from any suitable metal bar stock and are flexible whereby the operator can spread them slightly for purposes of convenience as desired. The embodiment of FIGS. 4 and 5 would be operated in the same manner as described hereinbefore for the embodiment of FIG. 1.

FIGS. 6 and 7 illustrate a third embodiment of the invention. In this embodiment the knife blade 10b is formed integral with the horizontal foot rest 11b and preferably along the front edge thereof. The foot rest 11b is provided with the upwardly and outwardly extended arms 12b and 13b which are connected to the arms 16b and 17b by means of the bolts 18b and nuts 19b. The arms 12b and 13b extend into suitable slots as 14b and 15b which are formed in the lower ends of the upwardly and outwardly extended arms 16b and 17b. The embodiment of FIGS. 6 and 7 functions in the same manner as the embodiment of FIG. 1.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

An integral sod edger comprising a U-shaped member having a horizontal foot rest at the bight of the U, the arms of the U extending upwardly and outwardly at a slight divergent angle, an edging blade depending from the foot rest and handles on the upper ends of the arms.

References Cited in the file of this patent
UNITED STATES PATENTS

| 52,279 | Fasig | Jan. 30, 1866 |
| 1,931,349 | Habig | Oct. 17, 1933 |
| 2,506,371 | Lint | May 2, 1950 |
| 2,594,508 | Sitton | Apr. 29, 1952 |
| 2,707,829 | Fisk | May 10, 1955 |
| 2,814,875 | Seals | Dec. 3, 1957 |